July 10, 1962 C. W. VOGT 3,043,483
DISPENSING CONTAINER
Filed Nov. 18, 1957

INVENTOR.
CLARENCE W. VOGT
BY
Brumbaugh, Free, Graves & Donohue
his ATTORNEYS

United States Patent Office 3,043,483
Patented July 10, 1962

3,043,483
DISPENSING CONTAINER
Clarence W. Vogt, Rte. 4, Weston, Conn.
Filed Nov. 18, 1957, Ser. No. 697,111
10 Claims. (Cl. 222—207)

This invention relates to improvements in dispensers for pulverulent materials and more particularly to new dispensers of the type which are capable of dispensing their contents in accurately measured amounts and in a sifted condition.

In my co-pending application, Serial No. 680,993, filed August 29, 1957, is disclosed a new type of dispenser by means of which accurately measured amounts of pulverulent or powdered materials such as flour, powdered sugar and the like can be dispensed into a closure for the dispenser which serves as a measuring cup.

The present invention constitutes an improvement over the dispenser disclosed in the aforementioned application by means of which the amount of material discharged from the dispensing device is even more accurately measured and the material is thoroughly fluffed or sifted as an incident of its discharge from the container.

Moreover, the new dispensing device may be provided with automatically operated closure for further protecting the powdered material when the dispenser is not in use.

Generally speaking, a dispensing container according to the present invention is provided wtih a squeezable container or receptacle for powdered materials, the container having a dispensing aperture at one end through which the pulverulent material in the container is discharged by squeezing the container into the measuring cup-like closure. A novel feature of the new dispenser is the provision of a member or post carried by the closure, the member or post extending toward and having an end portion opposing the dispensing opening in the container. By arranging the member or post adjacent to the opening, a narrow annular discharge slot is formed between them through which the pulverulent material is forced laterally into the measuring cup closure to prevent piling up of the material in the form of a cone and to assure the filling of the container to a level corresponding to about the height of the member or slot. When sufficient pulverulent material has been discharged to fill the measuring cup closure to the level or only slightly above the level of the annular discharge slot, additional material cannot be discharged even when very substantial pressure is applied to the walls of the squeezable container. The presure packs the pulverulent material in the discharge slot and under such conditions, even a relatively high force cannot displace the powdered material laterally through the slot so that overfilling of the measuring cup-like closure for the dispenser is effectively prevented. An additional advantage is derived from the inclusion of the post or member in the closure cup. Discharge of the pulverulent material through the narrow slot and the abrupt change of direction of the material as well as impact against the end of the post causes an intense fluffing and sifting of the pulverulent material. The volume of material per unit of weight in the measuring cup closure is essentially the same as volume of an equal weight of the powdered material which has been passed through a mechanical sifter.

The post in the measuring cup closure can be modified in accordance with the present invention to include a valve member which closes the discharge opening in the container when the opening is directed upwardly, as, for example, when the dispenser is resting on its bottom, to prevent entry of moisture or contaminating materials.

For a better understanding of the present invention, reference may be had to the accompanying drawing in which.

Figure 1:
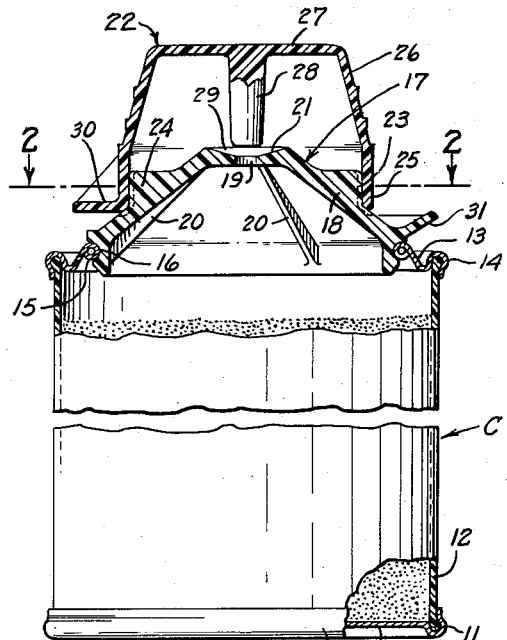
FIGURE 1 is an elevational view, partially vertical cross section and partially broken away, of a typical dispenser embodying the present invention.

In accordance with the present invention, a typical dispenser includes a squeezable container or receptacle for pulverulent material having a resilient side wall so that the container can be squeezed to force pulverulent material from the container. A suitable container C is illustrated in FIGURE 1. The container includes a bottom or base closure 10 formed of thin sheet metal and has a bead edge 11 which is rolled into gripping and sealing engagement with a thin, resilient side wall 12 of cylindrical or other suitable shape formed of a resilient or flexible material such as polyethylene. Preferably, the wall 12 is transparent or translucent to enable its contents to be seen.

At the upper end of the side wall 12 is a rim-like flange 13 which may be formed on thin sheet metal and has a rolled bead edge 14 rolled into gripping and sealing engagement with the upper edge of the side wall 12. An inner rolled edge 15 on the rim 13 engages in a groove 16 in the lateral wall of an end closure member 17 which has a generally conical mid-portion 18 provided at its apex with a discharge opening 19. The closure 17 is formed of a semi-rigid plastic material and it may also be provided with reinforcing ribs 20 to strengthen it. The closure member can be flexed however, to enable it to be disengaged from the rim 13, so that the container can be filled or refilled. Other means may be included to enable the container to be refilled, for example, a removable plug in the bottom 10 of the container.

Immediately adjacent the opening 19, the end closure 17 may be slightly countersunk to form an inverted conical surface 21.

Figure 3:
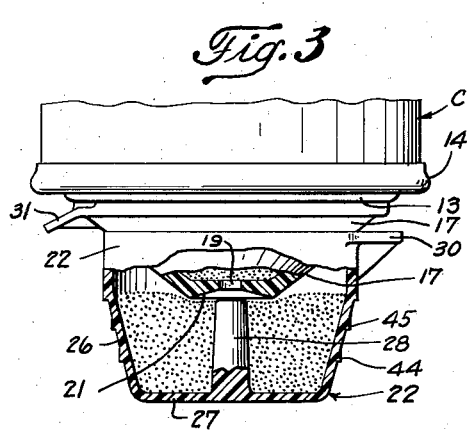
FIGURE 3 is an elevational view, partially in vertical section and partially broken away, with the dispenser in inverted position for dispensing pulverulent materials into the measuring cup closure.

A measuring cup-shaped closure 22 referred to hereinafter as a closure cup, is detachably mounted on the end closure member 17 by engagement with a series of ribs 23 on the outer periphery of an annular or cylindrical shoulder 24, about midway between the opening 19 and the outer edge of the end closure 17. As shown in FIGURES 1 and 3, the closure cup 22 has a cylindrical rim portion 25 for frictionally engaging the ribs 23, a conical or frusto-conical wall portion 26 and a flat bottom 27. While the closure cup 22 will normally be retained frictionally on the end closure 17 by engagement with the ribs 23 and serves as a closure for the container, it can be removed readily from the container.

Figure 2:
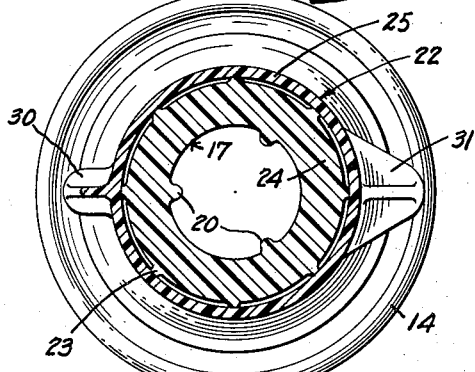
FIGURE 2 is a view in cross section taken on line 2—2 of FIGURE 1.

Centrally located on the bottom 27 of the closure cup is a post 28 which extends toward the discharge opening 19 and has its inner end opposing, and in closely spaced relation to the opening 19 when the closure cup 22 is mounted on the container C as shown in FIGS. 1 to 3. The end of the post is disposed substantially in the plane of the outer edge of the surface 21. The diameter of the end of the post 28 is somewhat greater than the diameter of the discharge opening 19. For example, the opening 19 may be about 0.140 inch in diameter while the diameter of the inner end of the post 28 is on the order of 0.187 inch. Inasmuch as the end of the post 28 extends laterally beyond the edge of the opening, a narrow annular discharge slot 29 is formed between the post 28 and the conical surface 21.

In order to facilitate handling of the closure cup 22, it may be provided with a small manipulating tab or handle 30 projecting from one side thereof.

With the container filled or partially filled with a pulverulent material such as flour, a measured amount of material can be discharged into the closure cup 22 by inverting the dispenser, as shown in FIGURE 3, and squeezing the resilient wall 12 to discharge the material through the opening 19 into the closure cup 22. Continued or repeated squeezing of the wall 12 of the container C will force pulverulent material into the cup 22 until it rises in the closure cup 22 to about the level of the end of the post 28. When this level is attained, little if any more of the pulverulent material can be squeezed out of the container. The reason for this is that the material tends to become compacted in the space between the end of the post 28 and the conical surface 21 and the radial component of the force exerted by squeezing of the container is too small to shift the compacted material laterally against pressure of the material already present in the cup. Accordingly, further flow of material from the container C is effectively prevented.

The closure cup 22 can then be removed from the container C with a measured amount of material therein.

During flow of the pulverulent material from the container C into the closure cup 22, air may escape through the spaces between the ribs 23, but these spaces are too narrow to permit any of the material from escaping.

The provision of a relatively narrow laterally directed slot 29 between the opening 19 and the end of the post 28 forces the material to change direction sharply and to be scattered as it is discharged, thereby efficiently fluffing and separating the particles of pulverulent material. As a result, the material in the closure cup 22 will be in thoroughly sifted condition and will have a low density comparable to that of similar material sifted by conventional flour sifters or the like.

In order to facilitate removal of the end closure 17 of the container, it is desirable to provide a gripping member thereon by means of which the closure can be pulled out of the rim 13. To that end, the end closure 17 is provided with an outwardly extending tab 31 which can be gripped by the fingers and lifted to pull the closure 17 from the container.

The dispenser can be modified, for example, to include a valve member for closing the discharge opening of the container to prevent contamination of the powdered material therein.

Figure 4:
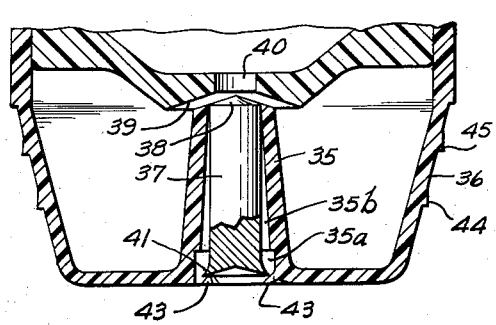
FIGURE 4 is a view in vertical cross section through the end portion of a dispenser having a modified type of closure and measuring cup, with the dispenser in a position to discharge pulverulent material therefrom and shown somewhat enlarged.
Figure 5:
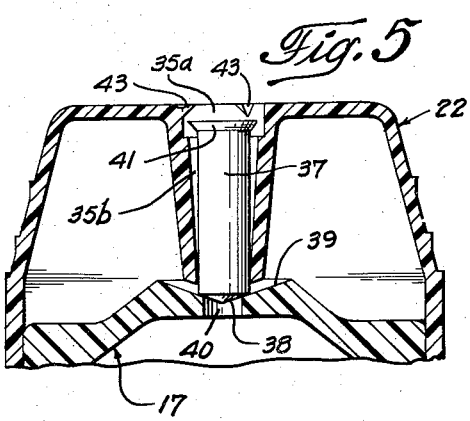
FIGURE 5 is a view in vertical section through a portion of a dispenser with the dispener upright and shown somewhat enlarged, illustrating the action of a valve for closing the discharge opening.

As shown in FIGURES 4 and 5, the center post 35 on the closure cup 36 is of tapered, hollow or tubular formation and receives a generally cylindrical valve plug 37 having a conical upper end 38 substantially complemental to the flared conical surface 39 adjacent to and encircling the discharge opening 40. A head 41 is formed on the outer end of the valve member 37 and is received in an enlarged portion 35a of the hole 35b in the post to limit inward movement of the valve member 37. Portions of the closure cup around the outer end of the enlarged opening portion 35a are pressed inwardly or otherwise deformed to provide projections 43 which cooperate with the enlarged head 41 to retain the valve member 37 in the post 35.

When the dispenser is inverted to enable pulverulent material to be discharged therefrom into the closure cup 36, the valve member 37 will drop toward the bottom of the cup 36 into a position in which the inner end of the valve member 37 substantially coincides with the end of the post 35 as shown in FIG. 4 thereby uncovering the discharge opening 40 and allowing pulverulent material to be discharged into the cup 36. When the dispenser is inverted and placed upon its base with the opening 40 directed upwardly, the valve member 37 will drop into engagement with the conical surface 39 and will cover and close the discharge opening 40, as shown in FIGURE 5, thereby preventing the entry of contaminating materials or moisture laden air or discharge of the contents of the container if it is jarred or shaken during handling.

Figure 6:
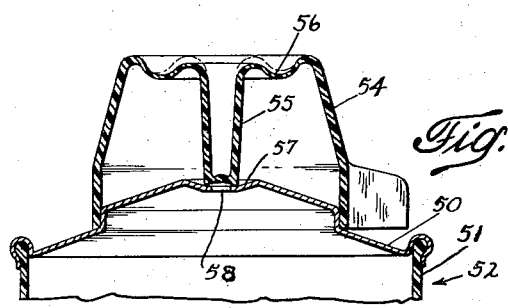
FIGURE 6 is a view in vertical section through an end portion of a modified form of dispenser and dispensing and measuring cup.

A modified dispenser of the non-refillable type is shown in FIGURE 6. In this form of dispenser, the upper end closure 50 is permanently secured to the side wall 51 of the container 52 and it may be formed of thin sheet metal or the like. A modified closure cup 54 for the container 52 is disclosed also in FIGURE 6. The closure cup 54 is formed of thin flexible material, such as polyethylene, and it has generally the same shape as the closure cups described above. A hollow post 55 having an inner closed end is disposed centrally of the cup and is supported resiliently by the corrugated bottom 56 of the closure cup 54. Normally the closed end of the post is urged by the resiliency of the bottom 56 of the closure cup into engagement with the annular surface 57 encircling the discharge opening 58 of the container to close the opening. Due to the resiliency of the bottom 56 of the closure cup, the post can be pushed away from the surface by the pressure of the material discharged from the container 52 when its side wall 51 is squeezed, thereby enabling the closure cup to be filled to about the level of the outer edge of the surface 56, as described above.

A closure cup 54 can be used, of course, with containers of the type disclosed in FIGURE 1, and other refillable containers.

From the preceding description of typical forms of the invention, it will be understood that the new dispensers assure very accurate control of the amount of material discharged therefrom. Of course, pulverulent material can be discharged from the container when the cup is removed to enable the container to be used for dusting products with flour, sugar and the like. If the closure cup is loosened and partially or completely removed from the container, it can be filled completely with the pulverulent material. It will be understood that the cup can be suitably calibrated to receive different measured amounts of material by providing measuring ribs 44, 45 thereon as shown in FIGS. 1 and 3.

While the containers illustrated have generally the shape of a can, it will be understood that containers of other shapes and sizes and made of other materials, such as containers formed wholly of resilient plastic material or the like can be used. Accordingly, the forms of the invention disclosed herein should be considered as illustrative and not as limiting the scope of the following claims.

I claim:

1. A dispensing container comprising a container for finely-divided solids having a resilient wall and a discharge opening at one end thereof, said solids being discharged through said opening by deflection of said resilient wall, an inverted cup-shaped closure detachably mounted on said container and overlying said dispensing opening, a member having a free end extending from said bottom of said closure, cooperating means on said container and said closure for maintaining the bottom of said closure in spaced relation to said discharge opening and said free end of said member in opposing relation to said discharge opening and means for venting air from said closure to the atmosphere outside said container.

2. A dispensing container comprising a squeezable container for finely-divided solids having a resilient wall and an end portion having a discharge opening therein, said solids being discharged through said opening by squeezing said container, a cup-shaped closure detachably engaging said end portion and overlying said opening, said closure having a resilient bottom portion spaced from said opening, and a post extending from said bottom portion into engagement with said end portion and opposing said opening and closing it, said post being displaceable from engagement with said end portion to uncover said opening by discharge of said solids when said container is squeezed.

3. A dispensing container comprising a can-like receptacle for finely divided, solid materials having a resilient side wall, a closed end and an opposite end portion having a discharge opening therein, said materials being discharged through said opening by deflection of said wall, a cup-shaped closure member detachably mounted on said end portion and having a bottom, a post-like projection on said bottom extending toward said opening and having an end opposing said opening, said end being of greater area than said opening, means on said receptacle and said member for maintaining the bottom of said closure member in spaced relation to said opposite end portion to form a measuring chamber therebetween, and portions in spaced relation on said closure member and said end portion to permit escape of air from said closure.

4. The container set forth in claim 3 in which said end portion is of substantially conical shape and at least a portion thereof extends into said closure member.

5. A dispensing container comprising a receptacle having a resilient side wall and a substantially conical end portion having a discharge opening in the apex thereof, a substantially cylindrical portion on said end portion, a plurality of angularly spaced substantially parallel ribs thereon, a cup-like closure member detachably engaging said ribs on said cylindrical portion and having a bottom and a sidewall, means for maintaining said bottom spaced from the apex of said conical end portion to form a measuring space, said ribs supporting said closure member in spaced relation to said cylindrical portion to provide air escape openings between said closure and said cylindrical portion, and a member extending inwardly from said bottom toward said opening and having an inner end opposing said opening.

6. A dispensing container comprising a receptacle having a resilient side wall and a substantially conical end portion having a discharge opening in the apex thereof, a substantially cylindrical portion on said end portion, a plurality of angularly spaced substantially parallel ribs on said cylindrical portion, a cup-like closure member detachably engaging said ribs on said cylindrical portion and having a bottom spaced from the apex of said conical end portion, said ribs supporting said closure member in spaced relation to said cylindrical portion to provide air escape openings between said closure and said cylindrical portion, a hollow member extending inwardly from said bottom toward said opening and having an inner end adjacent said opening, a valve member freely slidable in said hollow member and movable between a first position covering said opening and a second position spaced therefrom.

7. The dispensing container set forth in claim 6, in which said valve member has an end portion engageable with said conical end portion around said opening in said first position, said end portion of said valve member substantially coinciding with the inner end of said hollow member in said second position.

8. A dispensing container comprising a container having a resilient wall and a discharge opening at one end thereof, an inverted cup-shaped closure detachably mounted on said container and overlying said dispensing opening, said opening being spaced from the bottom of said closure, a member extending from the bottom of said closure toward and opposing said discharge opening, and a valve member slidably mounted in the member extending from the bottom of the closure, said valve member being movable toward said discharge opening to close it when the opening is directed upwardly and being movable away from said opening to uncover it when the latter is directed downwardly.

9. A dispensing container comprising a container for finely-divided solids having a resilient wall and a discharge opening at one end thereof, said solids being discharged through said opening by deflection of said resilient wall, an inverted cup-shaped closure detachably mounted on said container and overlying said dispensing opening, said opening being spaced from the bottom of said closure, a member extending from the bottom of said closure toward and having a free end larger than and opposing said discharge opening, and means on said closure supporting said member and urging it resiliently into engagement with said container around said opening to close said opening said member being displaceable from engagement with said end portion to uncover said opening by discharge of said solids when said resilient wall is deflected.

10. A dispensing device comprising a squeezable container for finely divided solid material having a resilient wall and a nozzle having a discharge opening at one end thereof, an inverted cup-shaped closure having a sidewall and a bottom detachably mounted on said container and overlying said discharge opening for receiving and measuring a predetermined quantity of said material, means on said closure and said container maintaining said bottom in spaced relation to said one end of said nozzle when said closure is mounted on said container, a member carried by said closure, extending from the bottom of said closure and having a free end in opposing relation to said discharge opening, and means forming spaces between said side wall of said closure and said container communicating with the interior of said closure for venting air therefrom while restraining passage of said material from said closure.

References Cited in the file of this patent

UNITED STATES PATENTS

| | | |
|---|---|---|
| 2,185,608 | Rose | Jan. 2, 1940 |
| 2,603,211 | Andreoli | July 15, 1952 |
| 2,663,463 | Benbury et al. | Dec. 22, 1953 |
| 2,690,861 | Tupper | Oct. 5, 1954 |
| 2,695,119 | Kishpaugh et al. | Nov. 23, 1954 |

FOREIGN PATENTS

| | | |
|---|---|---|
| 380,211 | France | Oct. 2, 1907 |
| 703,577 | Germany | Mar. 12, 1941 |